(12) United States Patent
Zarkani

(10) Patent No.: US 10,126,801 B2
(45) Date of Patent: Nov. 13, 2018

(54) COMPUTER POWER CONDITIONING SYSTEM

(71) Applicant: Navid Zarkani, Twin Falls, ID (US)

(72) Inventor: Navid Zarkani, Twin Falls, ID (US)

(*) Notice: Subject to any disclaimer, the term of this patent is extended or adjusted under 35 U.S.C. 154(b) by 294 days.

(21) Appl. No.: 15/087,418

(22) Filed: Mar. 31, 2016

(65) Prior Publication Data

US 2017/0285709 A1 Oct. 5, 2017

(51) Int. Cl.
*G06F 1/28* (2006.01)
*G06F 11/30* (2006.01)

(52) U.S. Cl.
CPC ............ *G06F 1/28* (2013.01); *G06F 11/3058* (2013.01)

(58) Field of Classification Search
CPC ............................... G06F 1/28; G06F 11/3058
See application file for complete search history.

(56) References Cited

U.S. PATENT DOCUMENTS

| 6,266,220 B1* | 7/2001 | Lahoud ................. H02H 3/207 361/104 |
| 6,449,676 B1 | 9/2002 | Johari et al. |
| 6,594,556 B1 | 7/2003 | Agatstein et al. |
| 7,917,775 B2 | 3/2011 | Chu |
| 8,446,053 B2 | 5/2013 | Kung |
| 2002/0007471 A1 | 1/2002 | Chang |
| 2012/0151242 A1 | 6/2012 | McGrath et al. |
| 2012/0161809 A1 | 6/2012 | Li |
| 2015/0372476 A1* | 12/2015 | Moen ..................... H02H 3/023 361/86 |

FOREIGN PATENT DOCUMENTS

WO WO9818181 4/1998

* cited by examiner

*Primary Examiner* — Scott Bauer

(57) ABSTRACT

A computer power conditioning system for includes an electronic device that has a power supply and a motherboard. The power supply is electrically coupled to the motherboard. The power supply may be electrically coupled to a power source. A power conditioner is selectively electrically coupled between the power supply and the motherboard. The power conditioner conditions an electrical current passing from the power supply to the motherboard. Thus, the motherboard is protected from being damaged by improper voltage and current from the power supply.

4 Claims, 2 Drawing Sheets

COMPUTER POWER CONDITIONING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to conditioning devices and more particularly pertains to a new conditioning device for protecting a computer motherboard from damage caused by a faulty power supply.

BRIEF SUMMARY OF THE INVENTION

An embodiment of the disclosure meets the needs presented above by generally comprising an electronic device that has a power supply and a motherboard. The power supply is electrically coupled to the motherboard. The power supply may be electrically coupled to a power source. A power conditioner is selectively electrically coupled between the power supply and the motherboard. The power conditioner conditions an electrical current passing from the power supply to the motherboard. Thus, the motherboard is protected from being damaged by improper voltage and current from the power supply.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
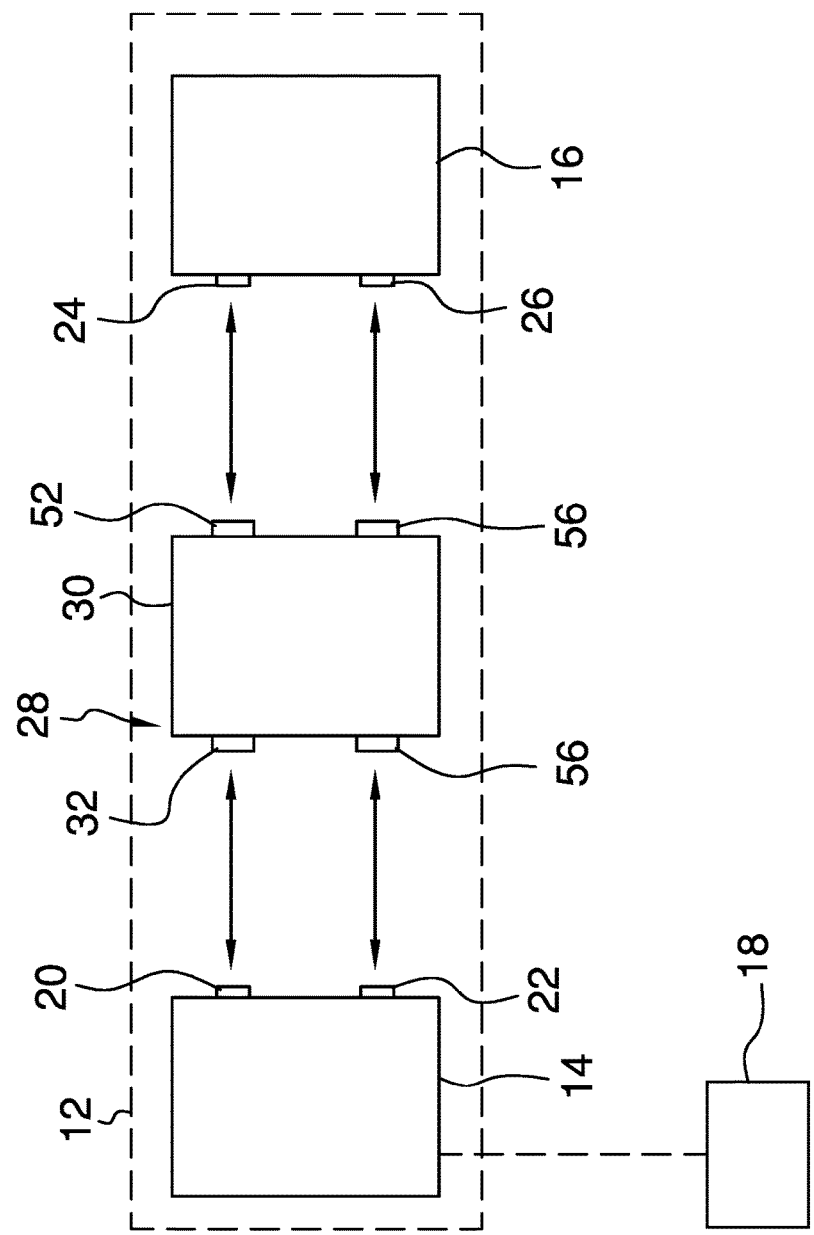
FIG. 1 is a perspective view of a computer power conditioning system according to an embodiment of the disclosure.
Figure 2:
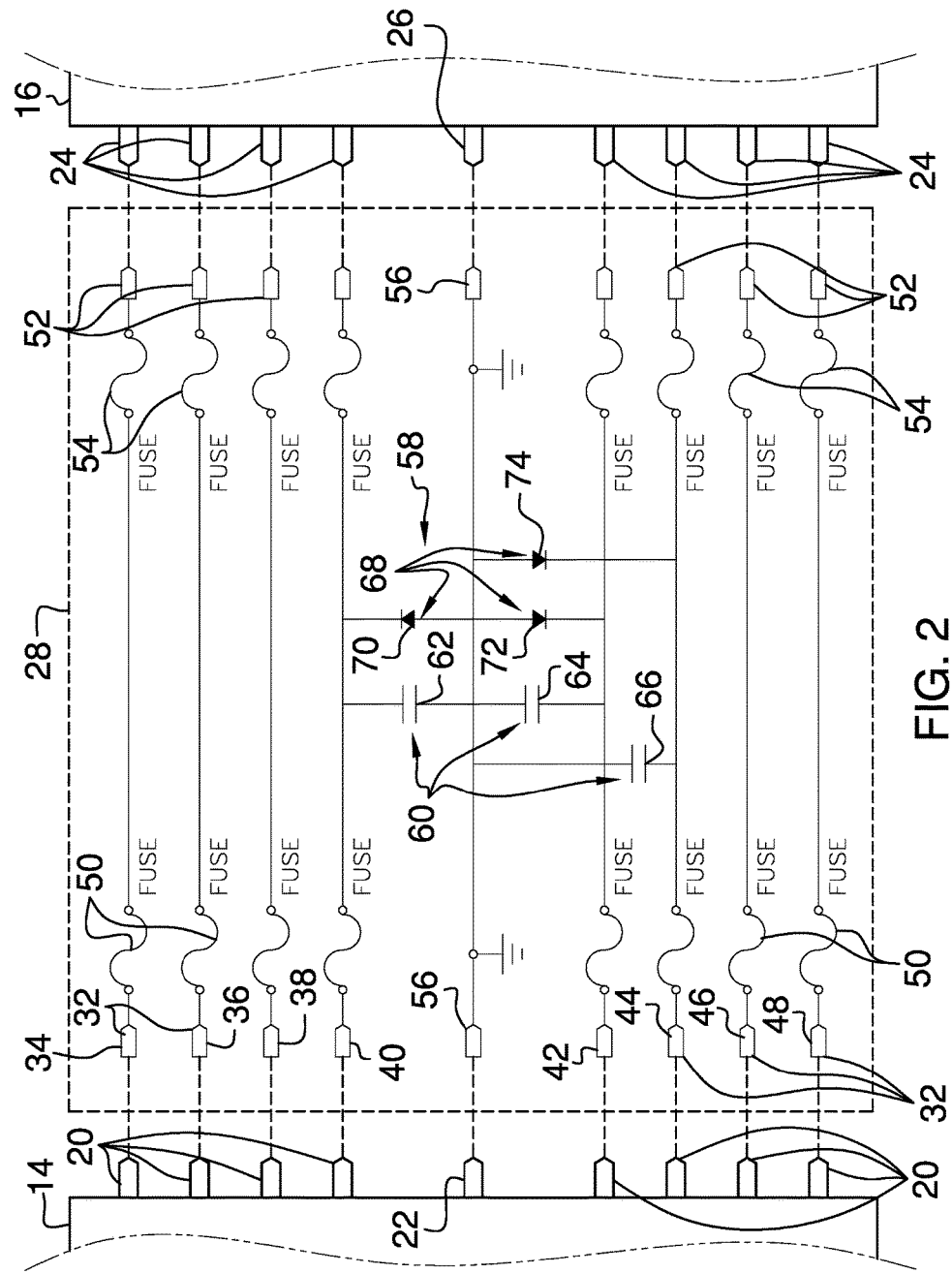
FIG. 2 is a schematic view of a power conditioner of an embodiment of the disclosure.

With reference now to the drawings, and in particular to FIGS. 1 through 2 thereof, a new conditioning device embodying the principles and concepts of an embodiment of the disclosure and generally designated by the reference numeral 10 will be described.

As best illustrated in FIGS. 1 through 2, the computer power conditioning system 10 generally comprises an electronic device 12 that has a power supply 14 and a motherboard 16. The power supply 14 is electrically coupled to the motherboard 16. The power supply 14 may be electrically coupled to a power source 18. The power source 18 may comprise an electrical outlet or the like. The power supply 14 has a plurality of outputs 20 and a ground 22. The motherboard 16 has a plurality of inputs 24 and a ground 26. The electronic device 12 may comprise a personal computer or the like.

A power conditioner 28 is provided. The power conditioner 28 may be selectively electrically coupled between the power supply 14 and the motherboard 16. Thus, the power conditioner 28 may condition an electrical current passing from the power supply 14 to the motherboard 16. The power conditioner 28 inhibits the motherboard 16 from being damaged by improper voltage and current from the power supply 14 when the power supply 14 fails to function properly.

The power conditioner 28 comprises a housing 30 that may be selectively positioned in the electronic device 12. A plurality of inputs 32 is provided and each of the inputs 32 corresponding to the power conditioner 28 is coupled to the housing 30. Each of the inputs 32 corresponding to the power conditioner 28 is electrically coupled to an associated one of the outputs 20 corresponding to the power supply 14.

The plurality of inputs 32 corresponding to the power conditioner 28 may comprise a first input 34, a second input 36, a third input 38, a fourth input 40, a fifth input 42, a six input 44, a seventh input 46 and an eight input 48. The first input 34 may carry a Power OK signal. The second input 36 may carry positive five volts DC. The third input 38 may carry negative twelve volts DC.

The fourth input 40 may carry positive three and one third volts DC. The fifth input 42 may carry positive twelve volts DC. The sixth input 44 may carry positive five volts DC. The seventh input 46 may carry negative five volts DC. The power conditioner 28 may comply with ATX computer power supply wire coding.

A plurality of input fuses 50 is provided and each of the input fuses 50 is positioned within the housing 30. Each of the input fuses 50 is electrically coupled to an associated one of the inputs 32 corresponding to the power conditioner 28. Thus, each of the input fuses 50 may inhibit excessive electrical current from is passed through the power conditioner 28. Each of the input fuses 50 may comprise electrical fuses or the like.

The power conditioner 28 includes a plurality of outputs 52. Each of the outputs 52 corresponding to the power conditioner 28 is coupled to the housing 30. Each of the outputs 52 corresponding to the power conditioner 28 is electrically coupled to an associated one of the inputs 32 corresponding to the power conditioner 28. Each of the outputs 52 corresponding to the power conditioner 28 is electrically coupled to an associated one of the inputs 24 corresponding to the motherboard 16. Moreover, each of the outputs 52 corresponding to the power conditioner 28 delivers the signal on the associated input 32 corresponding to the power conditioner 28.

A plurality of output fuses 54 is provided and each of the output fuses 54 is positioned within the housing 30. Each of the output fuses 54 is electrically coupled to an associated one of the outputs 52 corresponding to the power conditioner 28. Thus, each of the output fuses 54 may inhibit excessive electrical current from being passed though the power conditioner 28. Moreover, each of the output fuses 54 provides redundant circuit protection with respect to the input fuses 50.

The input fuse 50 corresponding to the first input 34 may be a twenty ampere fuse. The input fuse 50 corresponding to the second input 36 may be a forty ampere fuse. The input fuse 50 corresponding to the third input 38 may be a forty five ampere fuse. The output fuse 54 corresponding to the first input 34 may be a twenty ampere fuse. The output fuse 54 corresponding to the second input 36 may be a forty ampere fuse. The output fuse 54 corresponding to the third input 38 may be a forty five ampere fuse.

The power conditioner 28 includes a ground 56 that is coupled to the housing 30. The ground 56 corresponding to the power conditioner 28 is electrically coupled to the ground 22 corresponding to the power supply 14. Additionally, the ground 56 corresponding to the power conditioner 28 is electrically coupled to the ground 26 corresponding to the motherboard 16. The ground 56 corresponding to the power conditioner 28 may be electrically coupled to the housing 30. Thus, the housing 30 may be electrically grounded to the electronic device 12.

A protection circuit 58 is positioned within the housing 30. The protection circuit 58 is electrically coupled between the ground 56 corresponding to the power conditioner 28 and selected ones of the inputs 32 corresponding to the power conditioner 28. Thus, the protection circuit 58 may filter noise from the power source 18. The protection circuit 58 may include a plurality of capacitors 60. Each of the capacitors 60 may be a one micro Farad capacitor.

The plurality of capacitors 60 may include a first capacitor 62, a second capacitor 64 and a third capacitor 66. The first capacitor 62 may be electrically coupled between the ground 56 corresponding to the power conditioner 28 and the fourth input 40. The second capacitor 64 may be electrically coupled between the ground 56 corresponding to the power conditioner 28 and the fifth input 42. The third capacitor may be electrically coupled between the ground corresponding to the power conditioner and the sixth input.

The protection circuit 58 may include a plurality of diodes 68. The plurality of diodes 68 may include a first diode 70, a second diode 72 and a third diode 74. Each of the diodes 68 inhibit voltage from being delivered to the ground 56 corresponding to the power conditioner 28. Each of the diodes 68 may comprise a zener diode or the like.

The first diode 70 may be electrically coupled between the ground 56 corresponding to the power conditioner 28 and the fourth input 40. The second diode 72 may be electrically coupled between the ground 56 corresponding to the power conditioner 28 and the fifth input 42. The third diode 74 may be electrically coupled between the ground 56 corresponding to the power conditioner 28 and the sixth input 44. The protection circuit 58 inhibits a flow of electrical current between the ground 56 corresponding to the power conditioner 28 and the associated inputs 32 corresponding to the power conditioner 28. Thus, the protection circuit 58 protects the motherboard 16 from voltage on the ground 26 corresponding to the motherboard 16.

In use, the power conditioner 28 is positioned within the electronic device 12. Each of the outputs 20 corresponding to the power supply 14 is electrically coupled to the associated input 32 corresponding to the power conditioner 28. Each of the inputs 24 corresponding to the motherboard 16 is electrically coupled to the associated output 52 corresponding to the power conditioner 28. The ground 22 corresponding to the power supply 14 is electrically coupled to the ground 56 corresponding to the power conditioner 28. The ground 26 corresponding to the motherboard 16 is electrically coupled to the ground 56 corresponding to the power conditioner 28. The electronic device 12 is employed in the convention of personal computers.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A computer power conditioning system comprising:
an electronic device having a power supply and a motherboard, said power supply being electrically coupled to said motherboard, said power supply being configured to be electrically coupled to a power source, said power supply having a plurality of outputs, said motherboard having a plurality of inputs; and
a power conditioner being selectively electrically coupled between said power supply and said motherboard wherein said power conditioner is configured to condition an electrical current passing from said power supply to said motherboard thereby inhibiting said motherboard from being damaged by improper voltage and current from said power supply, said power conditioner comprising a housing being selectively positioned in said electronic device, said housing having a plurality of inputs, each of said inputs corresponding to said power conditioner being coupled to said housing, each of said inputs being electrically coupled to an associated one of said outputs corresponding to said power supply, said housing having a plurality of outputs, each of said outputs corresponding to said power conditioner being coupled to said housing, each of said outputs being electrically coupled to an associated one of said inputs corresponding to said power conditioner, each of said outputs being electrically coupled to an associated one of said inputs corresponding to said motherboard, a plurality of input fuses, each of said input fuses being positioned within said housing, each of said input fuses being electrically coupled to an associated one of said inputs corresponding to said power conditioner wherein each of said input fuses is configured to inhibit excessive electrical current from being passed through said power conditioner, and a plurality of output fuses, each of said output fuses being positioned within said housing, each of said output fuses being electrically coupled to an associated one of said outputs corresponding to said power conditioner wherein each of said output fuses is configured to inhibit excessive electrical current from being passed though said power conditioner thereby facilitating said output fuses to provide redundant protection with respect to said input fuses; and wherein at least one of said input fuses is electrically coupled in series with an associated one of said output fuses and in a direct connection with said associated one of said output fuses.

2. The system according to claim 1, wherein:
said power supply includes a ground;
said motherboard includes a ground;
said power conditioner includes a housing; and
said power conditioner includes a ground, said ground corresponding to said power conditioner being coupled to said housing, said ground corresponding to said power conditioner being electrically coupled between said ground corresponding to said power supply and said ground corresponding to said motherboard.

3. The system according to claim 2, wherein:
said power conditioner includes a plurality of inputs; and
said power conditioner includes a protection circuit being positioned within said housing, said protection circuit being electrically coupled between said ground corresponding to said power conditioner and selected ones of said inputs corresponding to said power conditioner wherein said protection circuit is configured to filter noise from the power source, said protection circuit being configured to inhibit a flow of electrical current between said ground corresponding to said power conditioner and said selected inputs corresponding to said power conditioner thereby facilitating said protection circuit to protect said motherboard from voltage on said ground corresponding to said motherboard.

4. A computer power conditioning system comprising:
an electronic device having a power supply and a motherboard, said power supply being electrically coupled to said motherboard, said power supply being configured to be electrically coupled to a power source, said power supply having a plurality of outputs and a ground, said motherboard having a plurality of inputs and a ground; and a power conditioner being selectively electrically coupled between said power supply and said motherboard wherein said power conditioner is configured to condition an electrical current passing from said power supply to said motherboard thereby inhibiting said motherboard from being damaged by improper voltage and current from said power supply, said power conditioner comprising:

a housing being selectively positioned in said electronic device, a plurality of inputs, each of said inputs corresponding to said power conditioner being coupled to said housing, each of said inputs being electrically coupled to an associated one of said outputs corresponding to said power supply, a plurality of input fuses, each of said input fuses being positioned within said housing, each of said input fuses being electrically coupled to an associated one of said inputs corresponding to said power conditioner wherein each of said input fuses is configured to inhibit excessive electrical current from being passed through said power conditioner, a plurality of outputs, each of said outputs corresponding to said power conditioner being coupled to said housing, each of said outputs corresponding to said power conditioner being electrically coupled to an associated one of said inputs corresponding to said power conditioner, each of said outputs being electrically coupled to an associated one of said inputs corresponding to said motherboard, a plurality of output fuses, each of said output fuses being positioned within said housing, each of said output fuses being electrically coupled to an associated one of said outputs corresponding to said power conditioner wherein each of said output fuses is configured to inhibit excessive electrical current from being passed though said power conditioner thereby facilitating said output fuses to provide redundant protection with respect to said input fuses, wherein at least one of said input fuses is electrically coupled in series with an associated one of said output fuses and in a direct connection with said associated one of said output fuses, a ground being coupled to said housing, said ground corresponding to said power conditioner being electrically coupled between said ground corresponding to said power supply and said ground corresponding to said motherboard, and a protection circuit being positioned within said housing, said protection circuit being electrically coupled between said ground corresponding to said power conditioner and selected ones of said inputs corresponding to said power conditioner wherein said protection circuit is configured to filter noise from the power source, said protection circuit being configured to inhibit a flow of electrical current between said ground corresponding to said power conditioner and said selected inputs corresponding to said power conditioner thereby facilitating said protection circuit to protect said motherboard from voltage on said ground corresponding to said motherboard.

* * * * *